(12) United States Patent
Lee

(10) Patent No.: US 9,977,272 B2
(45) Date of Patent: *May 22, 2018

(54) IN-CELL TOUCH DISPLAY PANEL STRUCTURE USING CONDUCTIVE WIRES TO CONNECT WITH SENSING ELECTRODES

(71) Applicant: SuperC-Touch Corporation, New Taipei (TW)

(72) Inventor: Hsiang-Yu Lee, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 260 days.

This patent is subject to a terminal disclaimer.

(21) Appl. No.: 14/482,425

(22) Filed: Sep. 10, 2014

(65) Prior Publication Data

US 2014/0375911 A1   Dec. 25, 2014

Related U.S. Application Data

(63) Continuation-in-part of application No. 14/019,889, filed on Sep. 6, 2013, now Pat. No. 9,164,306.

(30) Foreign Application Priority Data

Sep. 14, 2012  (TW) .............................. 101217823 U
Sep. 11, 2013  (TW) .............................. 102217063 U

(51) Int. Cl.
*G02F 1/1333*   (2006.01)
*G06F 3/041*    (2006.01)
(Continued)

(52) U.S. Cl.
CPC ...... *G02F 1/13338* (2013.01); *G02F 1/13439* (2013.01); *G02F 1/133512* (2013.01);
(Continued)

(58) Field of Classification Search
CPC .... G02F 1/13338; G06F 3/041; G06F 3/0412; G06F 3/044
See application file for complete search history.

(56) References Cited

U.S. PATENT DOCUMENTS 9,164,306 B2* 10/2015 Lee ......................... G06F 3/041
9,214,501 B2* 12/2015 Lee ....................... G06F 3/0412
(Continued)

*Primary Examiner* — Dung Nguyen
(74) *Attorney, Agent, or Firm* — Muncy, Geissler, Olds & Lowe, P.C.

(57) ABSTRACT

An in-cell touch display panel structure includes upper and lower substrates configured therebetween a display material layer, a black matrix sensing electrode layer, a sensing electrode trace layer, and an insulation layer. The black matrix sensing electrode layer is composed of a plurality of opaque conductor lines, which are patterned to form a plurality of sensing electrodes. The sensing electrode trace layer is composed of a plurality of trace conductor lines. The insulation layer is disposed between the sensing electrode trace layer and the black matrix sensing electrode layer. Each sensing electrode is connected with at least one trace conductor line. The plurality of trace conductor lines are disposed at positions corresponding to those of the plurality of opaque conductor lines of the black matrix sensing electrode layer.

14 Claims, 13 Drawing Sheets

(51) Int. Cl.
*G02F 1/1335* (2006.01)
*G02F 1/1343* (2006.01)
*G06F 3/044* (2006.01)

(52) U.S. Cl.
CPC .. *G02F 1/133603* (2013.01); *G02F 1/134336* (2013.01); *G06F 3/044* (2013.01); *G06F 3/0412* (2013.01)

(56) References Cited

U.S. PATENT DOCUMENTS

| | | | |
|---|---|---|---|
| 9,478,590 B2 * | 10/2016 | Lee | H01L 27/323 |
| 2009/0096760 A1 * | 4/2009 | Ma | G02F 1/13338 345/174 |
| 2009/0102814 A1 * | 4/2009 | Lin | G06F 3/044 345/174 |

* cited by examiner

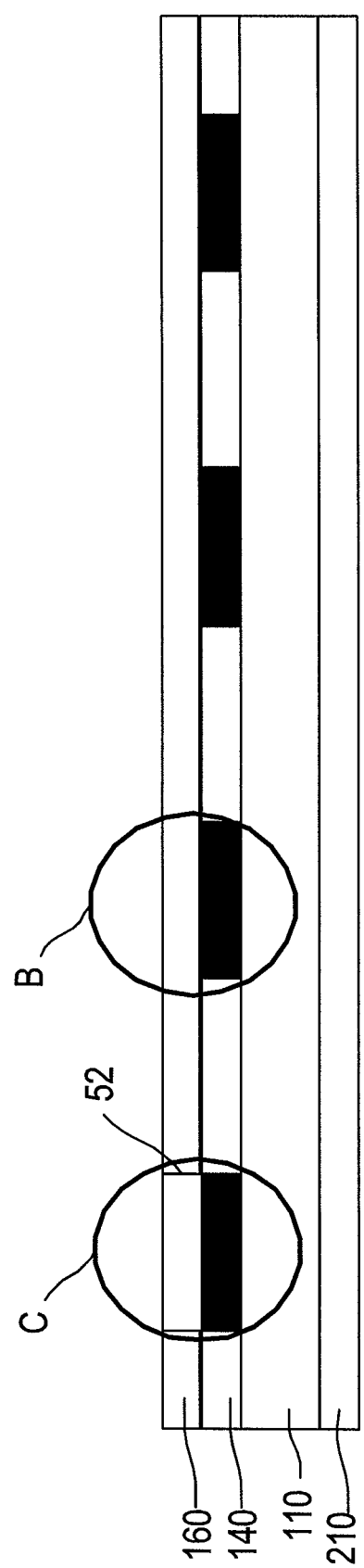
FIG. 6A
FIG. 6B

IN-CELL TOUCH DISPLAY PANEL STRUCTURE USING CONDUCTIVE WIRES TO CONNECT WITH SENSING ELECTRODES

CROSS REFERENCE TO RELATED APPLICATION

This application is a continuation-in-part (CIP) of U.S. patent application for an "In-cell touch display panel system using metal wires to connect with sensing electrodes", U.S. application Ser. No. 14/019,889, filed on Sep. 6, 2013.

This application claims the benefits of the Taiwan Patent Application Serial Number 102217063, filed on Sep. 11, 2013, the subject matter of which is incorporated herein by reference.

BACKGROUND OF THE INVENTION

1. Field of the Invention

The present invention relates to a structure of touch display panel and, more particularly, to an in-cell touch display panel structure using conductive wires to connect with sensing electrodes.

2. Description of Related Art

A conventional touch display panel includes a touch panel and a display unit overlapped with the touch panel. The touch panel is configured as an operation interface. The touch panel is transparent so that an image generated by the display unit can be viewed directly by a user without being sheltered by the touch panel. Such well known skill of the touch panel may increase additional weight and thickness of the touch display panel, and may further reduce the light penetration rate, and increase reflectance and haze of the touch display panel.

On-cell and in-cell touch technologies were invented to overcome the drawbacks of traditional touch technology described above. The on-cell technology is to dispose sensors on the back side of a color filter substrate to form a completed color filter substrate. One of the on-cell touch technologies is provided to dispose touch sensors on a thin film and then bond the thin film onto the upper one of the two substrates.

The in-cell technology is to dispose the sensors within the LCD cell structure. Currently, there are resistive, capacitive and optical three primary in-cell touch technologies, wherein the resistive touch technology employs two conductive substrates and the voltage variation of a common layer between the two substrates for determining a touch position on the touch display panel.

The in-cell touch technology is provided to integrate the touch sensor within the display unit so that the display unit is provided with the ability of the touch panel. Therefore, the touch display panel does not need to be bonded with an additional touch panel so as to simplify the assembly procedure. Such skill is generally developed by TFT LCD manufactures.

There is older touch control technology known as out-cell, which is typically applied to the resistive and capacitive touch panels. The out-cell touch technology is provided to add a touch module onto a display module. The touch module and the display module can be manufactured by the two separate parties.

However, for all the in-cell, on-cell and out-cell touch technologies, they all need a transparent sensing electrode layer to be configured on an upper or lower glass substrate, which not only increases the manufacturing cost but also complicates the manufacturing process, and which may also lower the aperture ratio and thus need to increase the strength of backlight, resulting in huge power consumption which is disadvantageous to make the mobile device compact. Therefore, it desired for the aforementioned touch display panel structure to be improved.

SUMMARY OF THE INVENTION

The object of the present invention is to provide an in-cell touch display panel structure using conductive wires to connect with sensing electrodes, which greatly decreases the weight and thickness of a touch display panel and also significantly reduces the material and manufacturing cost, while increasing the accuracy of touch sensing.

In accordance with one aspect of the invention, there is provided an in-cell touch display panel structure using conductive wires to connect with sensing electrodes, which comprises: an upper substrate; a lower substrate parallel to the first substrate; a display material layer configured between the upper substrate and the lower substrate; a black matrix sensing electrode layer disposed on one surface of the upper substrate facing the display material layer, the black matrix sensing electrode layer being composed of a plurality of opaque conductor lines, wherein a plurality of sensing electrodes are formed by patterning part of the plurality of opaque conductor lines; a sensing electrode trace layer disposed on one surface of the black matrix sensing electrode layer facing the display material layer, the sensing electrode trace layer being composed of a plurality of trace conductor lines; and an insulation layer disposed between the sensing electrode trace layer and the black matrix sensing electrode layer, wherein each sensing electrode is connected with at least one trace conductor line, and the plurality of trace conductor lines are disposed at positions corresponding to those of the plurality of opaque conductor lines of the black matrix sensing electrode layer.

In accordance with another aspect of the invention, there is provided an in-cell touch display panel structure using conductive wires to connect with sensing electrodes, which comprises: an upper substrate; a lower substrate parallel to the first substrate; a display material layer configured between the upper substrate and the lower substrate; a black matrix layer disposed on one surface of the upper substrate facing the display material layer, the black matrix layer being composed of a plurality of opaque lines; a sensing electrode layer formed on one surface of the black matrix layer facing the display material layer, the sensing electrode layer being composed of a plurality of conductor lines, the plurality of conductor lines being patterned to form a plurality of sensing electrodes; an insulation layer disposed on one surface of the sensing electrode layer facing the display material layer; and a sensing electrode trace layer disposed on one surface of the insulation layer facing the display material layer, the sensing electrode trace layer being composed of a plurality of trace conductor lines, wherein each sensing electrode is connected with at least one trace conductor line, and the plurality of trace conductor lines are disposed at positions corresponding to those of the plurality of opaque lines of the black matrix layer.

Other objects, advantages, and novel features of the invention will become more apparent from the following detailed description when taken in conjunction with the accompanying drawings.

BRIEF DESCRIPTION OF THE DRAWINGS

FIGS. 6A to 6F illustrate the manufacture process of the in-cell touch display panel structure using conductive wires to connect with sensing electrodes in accordance with the present invention;

DETAILED DESCRIPTION OF THE PREFERRED EMBODIMENT

Figure 1:
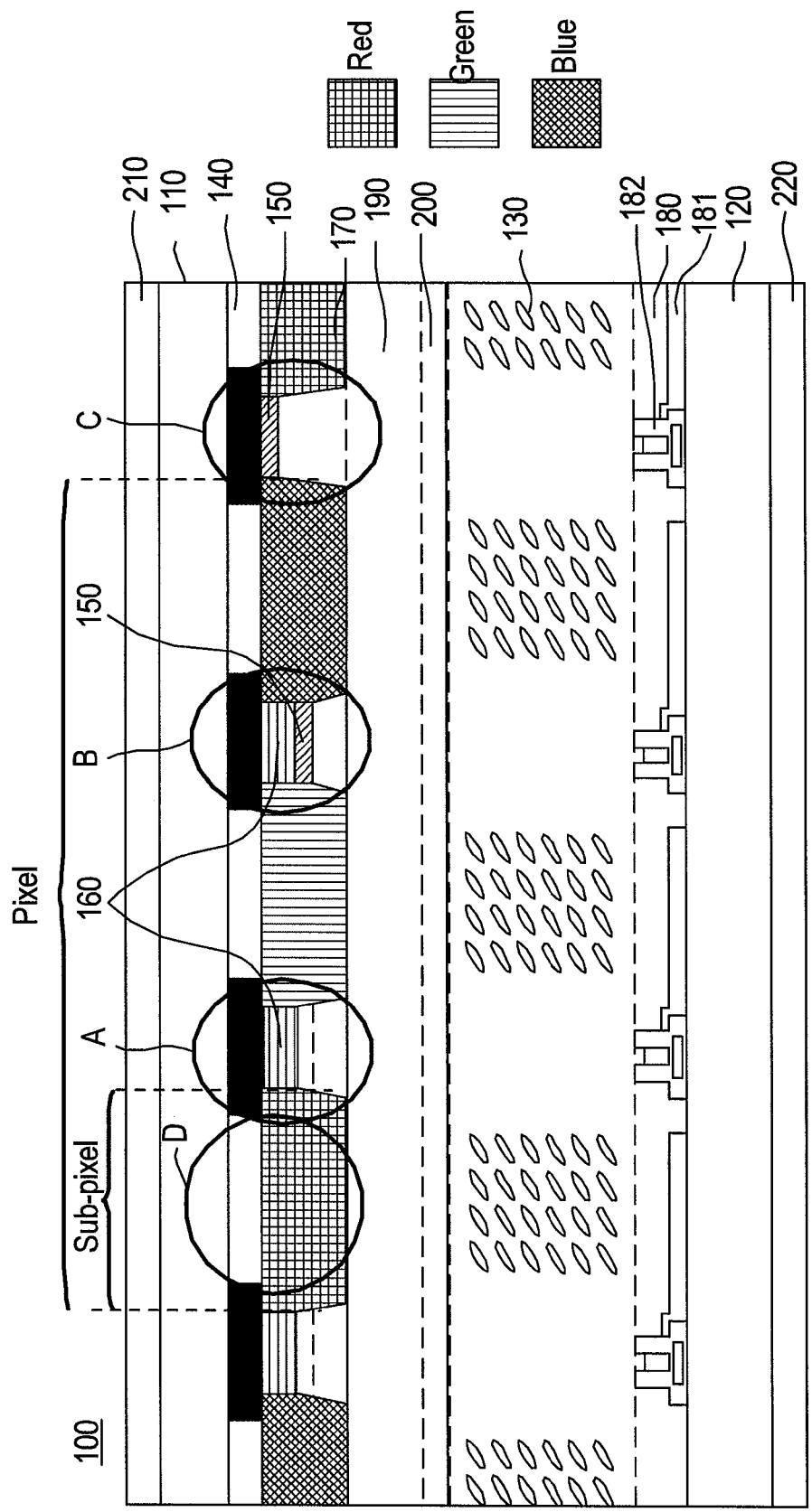
FIG. 1 illustrates a stack-up diagram for an embodiment of an in-cell touch display panel structure using conductive wires to connect with sensing electrodes.

In a stack-up diagram of a preferred embodiment of the present invention, an in-cell touch display panel structure using conductive wires to connect with sensing electrodes 100, as shown in FIG. 1, includes an upper substrate 110, a lower substrate 120, a display material layer 130, a black matrix sensing electrode layer 140, a sensing electrode trace layer 150, an insulation layer 160, a color filter layer 170, a thin film transistor layer 180, an overcoat layer 190, a common voltage (Vcom) layer 200, an upper polarizer layer 210, and a lower polarizer layer 220.

The upper substrate 110 and the lower substrate 120 are preferably glass substrates and are parallel to each other. The display material layer 130 is disposed between the upper and lower substrates 110, 120.

The black matrix sensing electrode layer 140 is between the upper substrate 110 and display material layer 130 and is disposed on one surface of the upper substrate 110 that faces the display material layer 130. The black matrix sensing electrode layer 140 is composed of a plurality of opaque conductor lines, wherein part of the plurality of opaque conductor lines is patterned to form a plurality of sensing electrodes.

Figure 2:
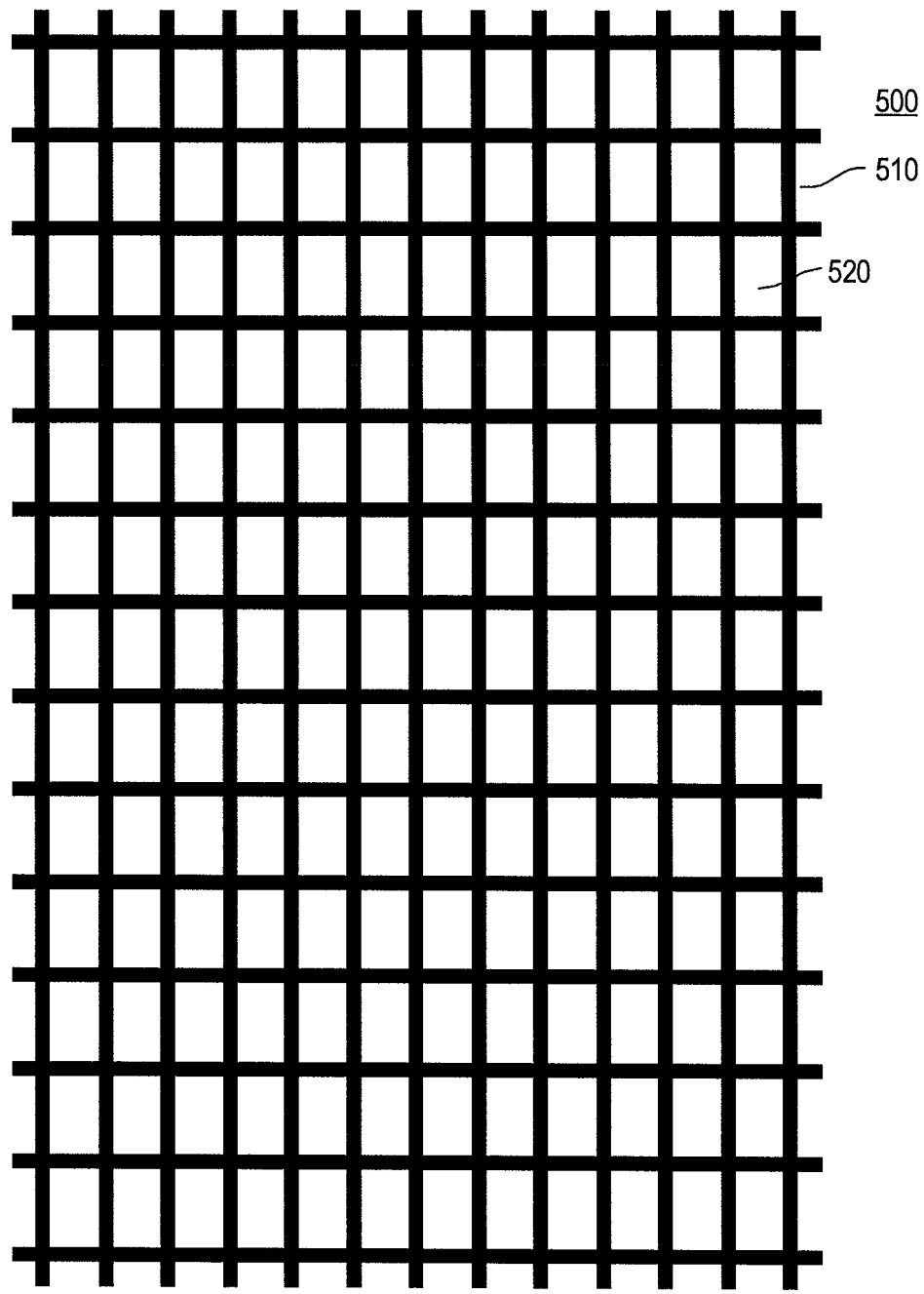
FIG. 2 is a schematic diagram of a prior black matrix layer.

FIG. 2 shows a prior black matrix layer. As shown, the prior black matrix layer 500 is composed of lines 510 of insulating material that are black and opaque. The lines 510 of black insulating material are arranged as a checkerboard pattern and the color filter is disposed among the spaces 520 defined by the lines 510 of black insulating material. It is noted that the dimension and the arrangement of the lines 510 of insulating material and the spaces 520, as shown in FIG. 2, are for illustrative purpose only, but not in actual dimension scale and ratio.

In the present invention, the black matrix sensing electrode layer 140 is obtained from changing the black and opaque insulating material of the prior black matrix layer 500 into opaque conductive material and patterning part of the plurality of opaque conductor lines to form a plurality of sensing electrodes, and the sensing electrode trace layer 150 is disposed on the surface of the black matrix sensing electrode layer 140 that faces the display material layer 130. The black matrix sensing electrode layer 140 has a plurality of sensing electrodes, and the electrical signal sensed thereby is transmitted via the sensing electrode trace layer 150 to a controller (not shown), so as to determine the touch position. Therefore, there is no need to dispose an extra sensing electrode layer on the upper glass substrate or lower glass substrate of the prior LCD panel, thereby saving the manufacturing cost, simplifying the assembly procedure and further improving the panel yield.

Figure 3:
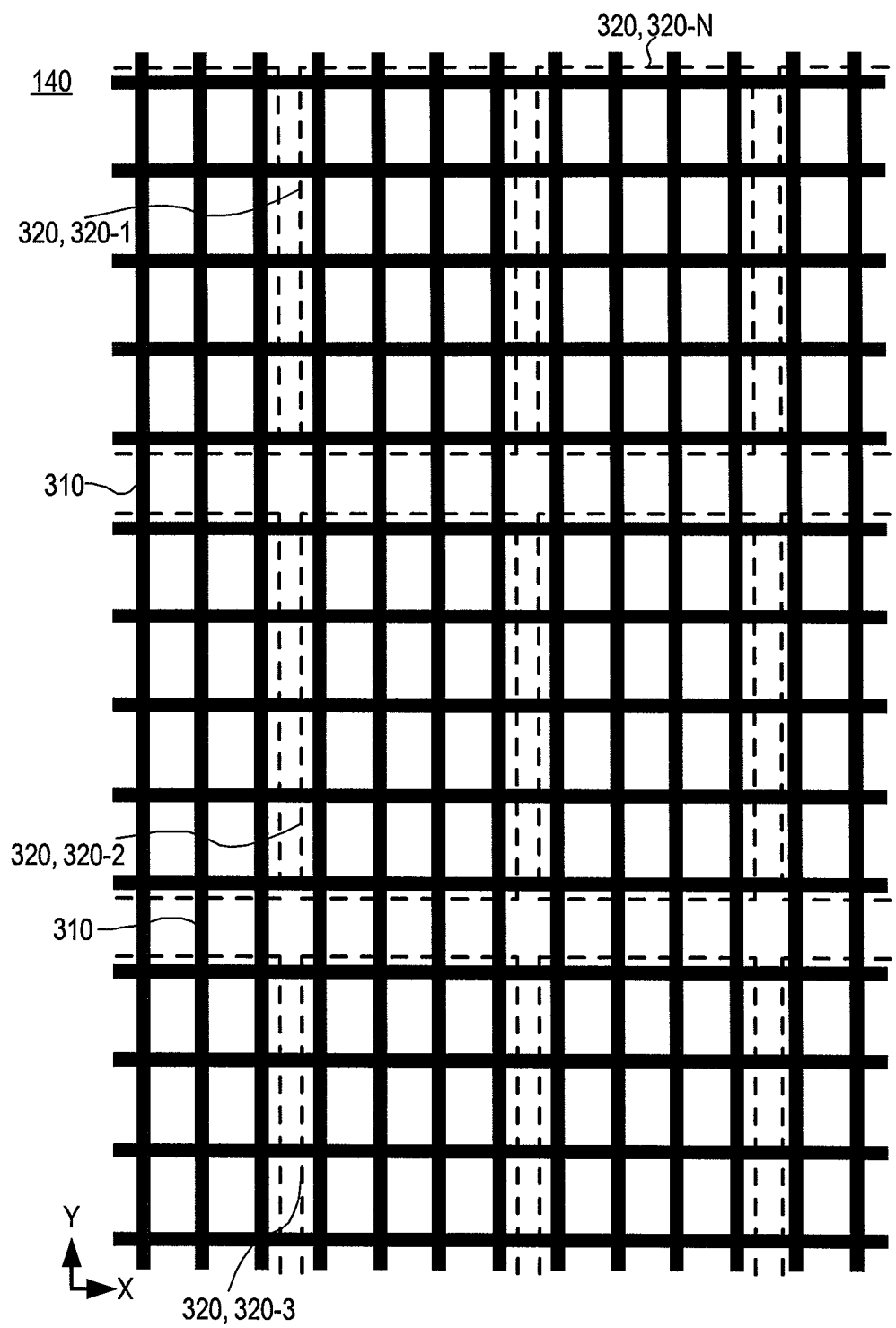
FIG. 3 is a schematic diagram of the black matrix sensing electrode layer.

FIG. 3 is a schematic diagram of the black matrix sensing electrode layer 140 in accordance with the present invention. As shown, the black matrix sensing electrode layer 140 is composed of a plurality of opaque conductor lines. The plurality of opaque conductor lines of the black matrix sensing electrode layer 140 are arranged in a first direction (X-axis direction) and a second direction (Y-axis direction), wherein the first direction is vertical to the second direction.

The plurality of opaque conductor lines of the black matrix sensing electrode layer 140 are made of opaque conductive material. Preferably, the plurality of opaque conductor lines of the black matrix sensing electrode layer 140 are made of black and opaque conductive material.

The plurality of opaque conductor lines are divided into a first group of opaque conductor lines 310 and a second group of opaque conductor lines 320.

The second group of opaque conductor lines 320 is formed with N polygonal regions 320-1 to 320-N, where N is a positive integer. The opaque conductor lines in each polygonal region are electrically connected together and any two polygonal regions are not electrically connected with each other, so as to form a single-layered sensing touch pattern on the black matrix sensing electrode layer 140. The polygonal region (320-1 to 320-N) may be formed in a triangle, rectangle, square, rhombus, hexagon, octagon, round shape, radiation shape, or wedge shape. In this embodiment, the N polygonal regions are formed in rectangle shapes.

Figure 4:
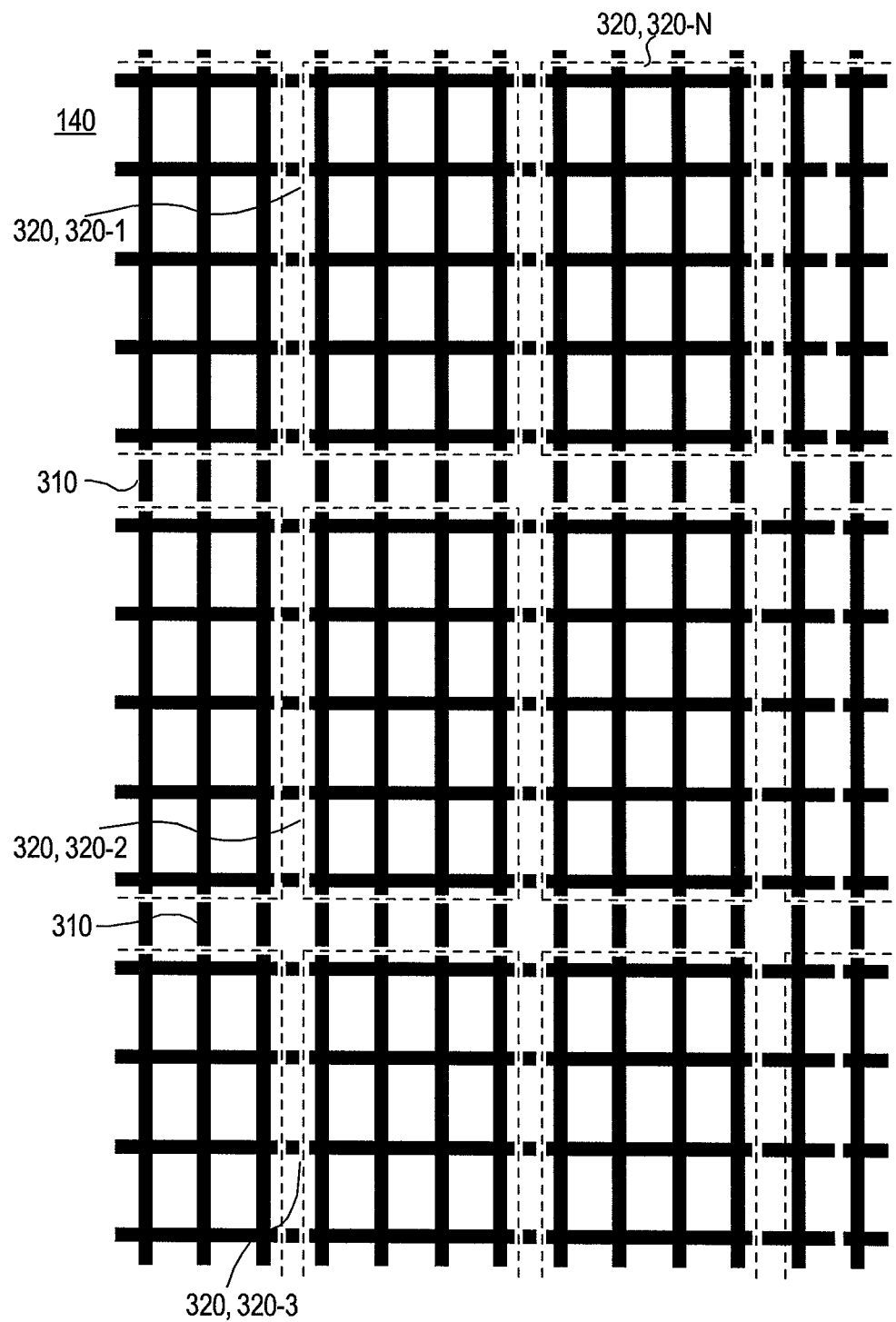
FIG. 4 is another schematic diagram of the black matrix sensing electrode layer.

FIG. 4 is another schematic diagram of the black matrix sensing electrode layer 140 in accordance with the present invention. As shown, the first group of opaque conductor lines 310 is spaced apart from (i.e., not electrically connected to) the second group of opaque conductor lines 320. In other words, the first group of opaque conductor lines 310 and the second group of opaque conductor lines 320 are not connected by cutting off opaque conductor lines in the prior black matrix layer. Therefore, the second group of opaque conductor lines 320 can be formed with a single-layered touch sensing pattern on the black matrix sensing electrode layer 140. It is noted that cutting the conductor lines herein does not mean to first form the prior black matrix layer 500, as shown in FIG. 2, and then cut off corresponding conductor lines. Instead, when proceeding with mask layout of the black matrix sensing electrode layer 140, the first group of opaque conductor lines 310 and the second group of opaque conductor lines 320 are formed by using layout tools, such as Laker or Virtuso, to allow the mask to be capable of spacing the first group of opaque conductor lines 310 and the second group of opaque conductor lines 320 from each other. Accordingly, there is no additional procedure required in the display panel manufacturing process.

As shown in FIG. 4 the plurality of polygonal regions 320-1 to 320-N are used as the plurality of sensing electrodes (320-1 to 320-N) of the black matrix sensing electrode layer 140. The plurality of sensing electrodes (320-1 to 320-N) are arranged in the first direction and the second direction.

Figure 5:
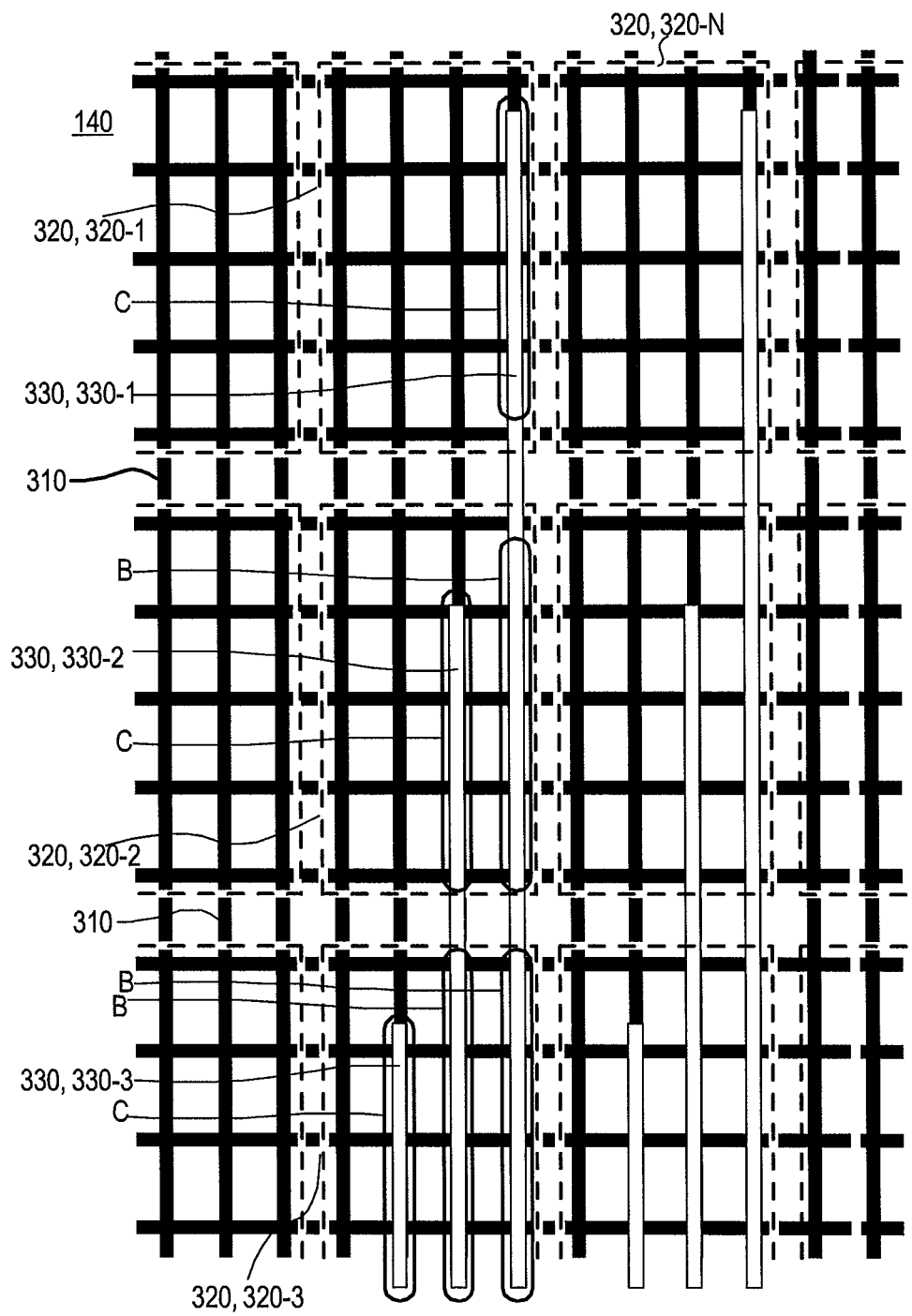
FIG. 5 is a schematic diagram of the sensing electrodes of the black matrix sensing electrode layer.

FIG. 5 is a schematic diagram of the sensing electrodes of the black matrix sensing electrode layer 140 in accordance with the present invention, which is viewed from the lower substrate 120 to the upper substrate 110. As shown in FIGS. 1 and 5, the sensing electrode trace layer 150 is disposed at one surface of the black matrix sensing electrode layer 140 that faces the display material 130, and an insulation layer 160 is arranged between the sensing electrode trace layer 150 and the black matrix sensing electrode layer 140. The sensing electrode trace layer 150 is composed of a plurality of trace conductor lines 330. The plurality of trace conductor lines 330 are disposed at positions corresponding to the positions of the plurality of opaque conductor lines of the black matrix sensing electrode layer 140.

The insulation layer 160 is disposed between the sensing electrode trace layer 150 and the black matrix sensing electrode layer 140. As shown by the oval "A" in FIG. 1, insulation material is filled in the portion of the insulation layer 160 where there is no trace conductor line 330 corresponding thereto. Further, as shown by the oval "B" in FIG. 1, insulation material is filled in the portion of the insulation layer 160 where there is trace conductor line 330 corresponding thereto if there is no need to connect the sensing electrodes (320-1 to 320-N) with the trace conductor line 330. Yet further, as shown by the oval "C" in FIG. 1, the portion of the insulation layer 160 where there is trace conductor line 330 corresponding thereto is left empty, so as to make an electrical connection of the sensing electrode 320 and the trace conductor line 330 during the manufacturing process of the sensing electrode trace layer 150. Still further, as shown by the oval "D" in FIG. 1, the portion has to allow light pass through and thus the portion is red color filter 170.

The plurality of sensing electrodes (320-1 to 320-N) are N polygonal regions and any two polygonal regions are not electrically connected with each other, so as to form a single-layered sensing touch pattern on the black matrix sensing electrode layer 140, where N is an integer greater than one. Each sensing electrode (320) is connected with at least one trace conductor line 330. The trace conductor lines 330 that are connected with different sensing electrodes (320) are not connected with each other. The plurality of trace conductor lines 330 of the sensing electrode trace layer 150 are made of conductive metal material, wherein the conductive metal material is selectively to be chromium, barium, aluminum, silver, copper, titanium, nickel, tantalum, cobalt, tungsten, magnesium, calcium, potassium, lithium, indium, their alloy, or combination of lithium fluoride, magnesium fluoride, lithium oxide As shown in FIG. 5, the trace conductor line 330-1 is electrically connected with the sensing electrode 320-1 via the empty of the insulation layer 160, as shown by the oval "C" in FIG. 1. When the trace conductor line 330-1 goes down and passes through the sensing electrode 320-2, due to the trace conductor line 330-1 and the sensing electrode 320-2 both being conductive, insulation material is arranged between the trace conductor line 330-1 and the sensing electrode 320-2, as shown by the oval "B" in FIG. 1. The remaining trace conductor lines 330 and sensing electrodes 320 have the same arrangement and thus a detailed description therefore is deemed unnecessary. It is noted that, for the purpose of clearly illustrating the trace conductor lines 330 and the sensing electrodes 310, the insulation layer 160 is not shown in FIG. 5.

Figure 6C:
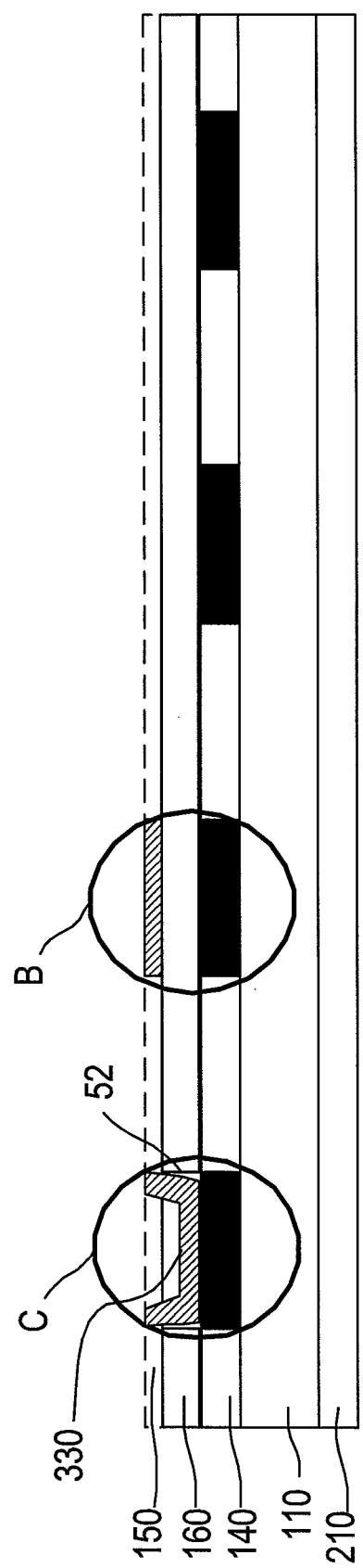

FIGS. 6A to 6F illustrate the manufacture process of the in-cell touch display panel structure using conductive wires to connect with sensing electrodes in accordance with the present invention. With reference to FIG. 6A, it first forms the black matrix sensing electrode layer 140 on the upper substrate 110. When forming the black matrix sensing electrode layer 140, with the photo mask of the black matrix sensing electrode layer 140, the first group of opaque conductor lines 310 and the second group of opaque conductor lines 320, i.e., the plurality of sensing electrode (320-1 to 320-N), are also formed at the same time.

With reference to FIG. 6B, the insulation layer 160 is formed on the black matrix sensing electrode layer 140. Then, etching is performed at a position of the insulation layer 160 corresponding to the trace conductor line 330, as shown by the oval "C", so as to form a via 52 in the insulation layer 160 corresponding to the trace conductor line 330 of the sensing electrode trace layer 150. The via 52 is the aforementioned empty in the insulation layer 160.

With reference to FIG. 6C, the trace conductor lines 330 of the sensing electrode trace layer 150 are formed on the insulation layer 160 corresponding to the opaque lines of the black matrix sensing electrode layer 140. As shown, when manufacturing the trace conductor line 330, because there is a via 52 (empty of the insulation layer 160) at the position indicated by the oval "C", the trace conductor line 330 will go down at the position indicated by the oval "C" for thus electrically connecting to the sensing electrode.

Figure 6D:
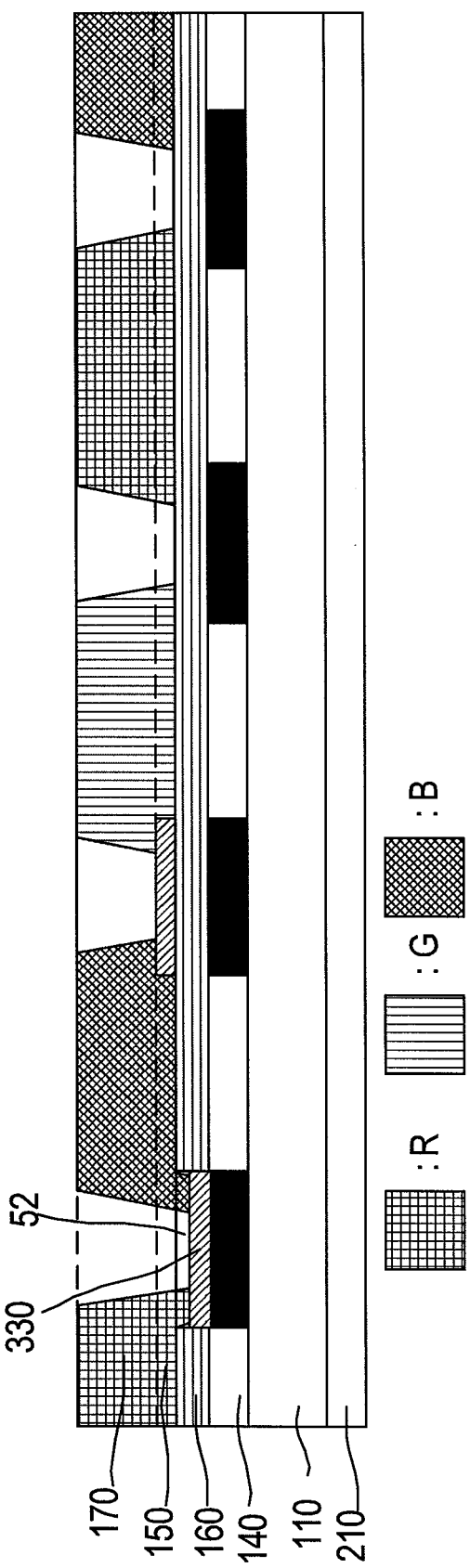
Figure 6E:
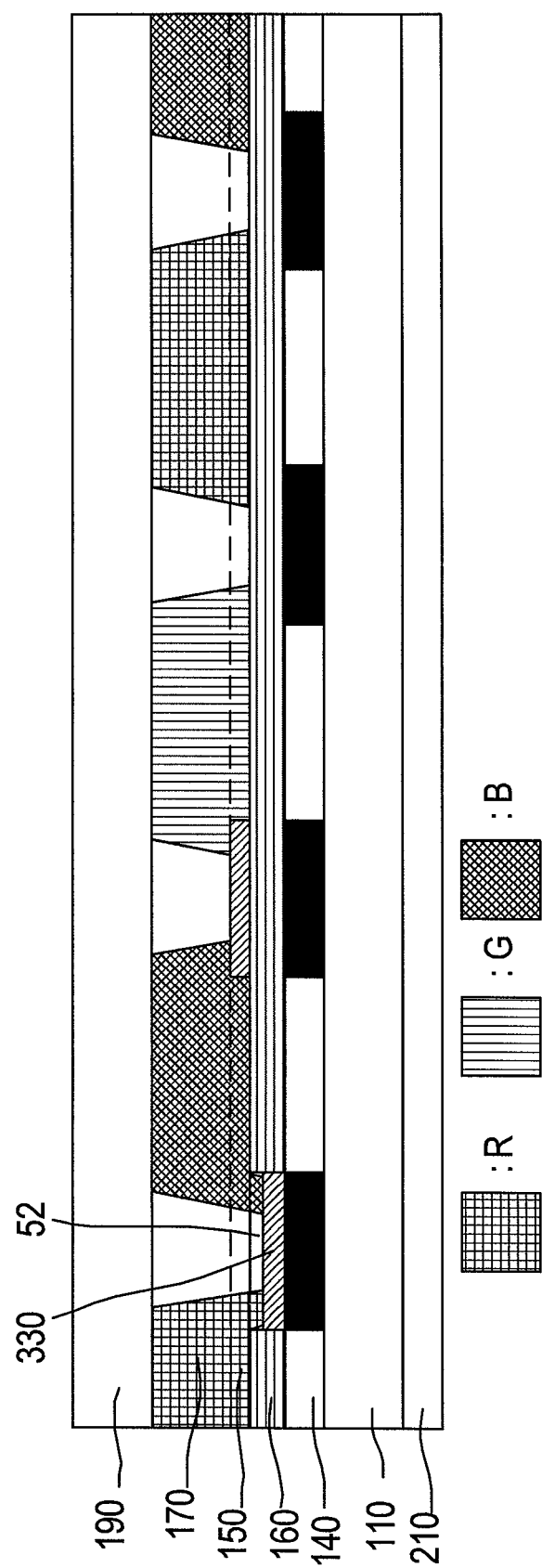
Figure 6F:
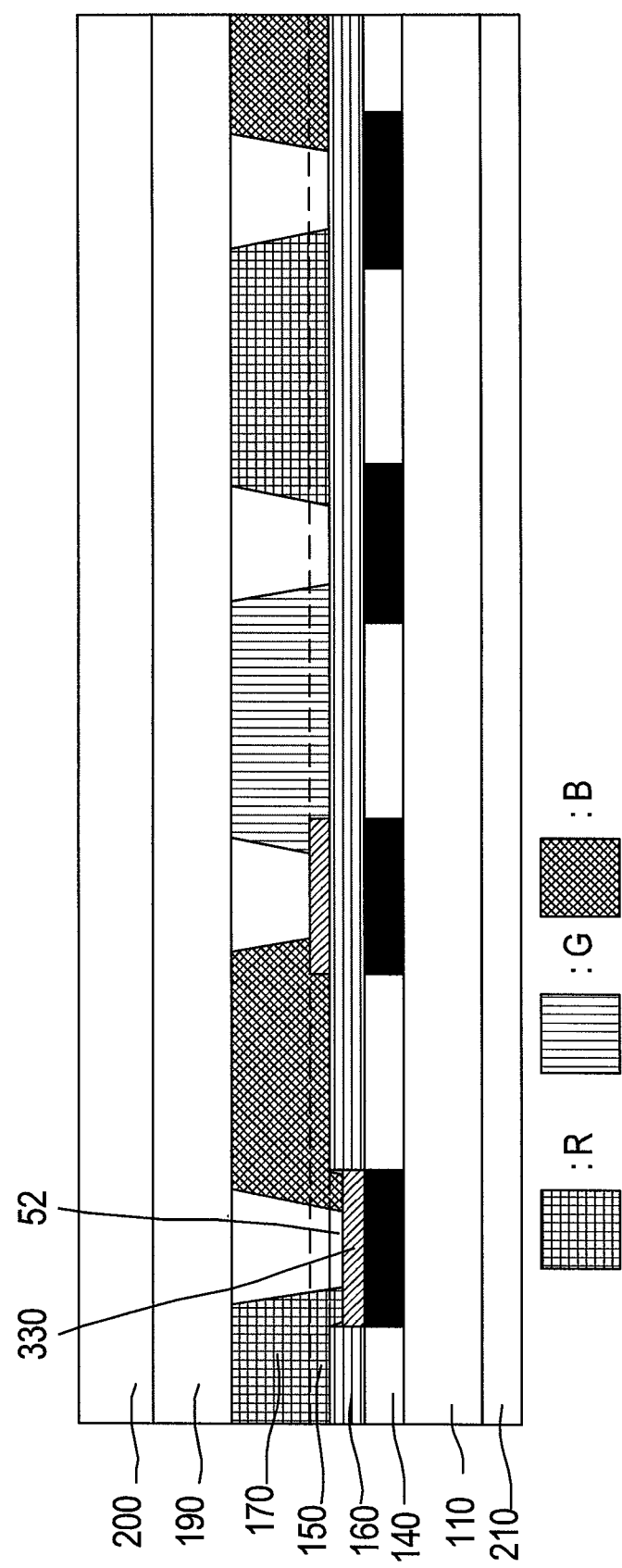

With reference to FIG. 6D, the color filter layer 170 is formed on the insulation layer 160 and the trace conductor lines 330. Then, the overcoat layer 190 is formed on the color filter layer 170, as illustrated in FIG. 6E. With reference to FIG. 6F, the common voltage layer 200 is then formed on the overcoat layer 190. If an IPS-type or FFS-type LCD or OLED display is employed, there is no need to for the common voltage layer 200 on the upper glass substrate.

As shown in FIG. 5, the size of a sensing electrode (320-1 to 320-N) is about 5 mm, while the distance between opaque conductor lines (510) is about 50 to 200 μm. Therefore, one edge of the sensing electrode 310 may correspond to 50 to 100 opaque conductor lines (510). That is, one edge of the sensing electrode 320 may correspond to as many as one hundred opaque conductor lines (510). In the present invention, the width of the trace conductor line 330 is slightly smaller than that of the opaque conductor line (510), and the plurality of trace conductor lines 330 are disposed to overlap with the opaque conductor lines (510), so that the electrical signal sensed by the sensing electrodes (320-1 to 320-N) is transmitted to a controller (not shown) via the trace conductor lines 330 of the sensing electrode trace layer 150, thereby determining the touched position. That is, the present invention is provided to form a plurality of sensing electrodes (320-1 to 320-N) on a prior black matrix layer 500, so as to constitute the black matrix sensing electrode layer 140. Accordingly, there is no need to dispose an extra sensing electrode layer on the upper glass substrate or lower glass substrate of the prior LCD panel, thereby saving the manufacturing cost, simplifying the assembly procedure, improving the production yield, increasing the light penetration rate and decreasing the power consumption.

The trace conductor lines 330 are made of conductive metal material or alloy, which has impedance much smaller than that of the transparent conductive ITO. Therefore, the line width of the trace conductor line 330 can be made relatively thin, and thus the trace conductor lines 330 can be disposed below the opaque conductor lines (510) without affecting the aperture ratio.

The width of the trace conductor line 330 is slightly smaller than that of the opaque conductor line (510). When viewing from the upper substrate 110 to the lower substrate 120, the trace conductor lines 330 can be sheltered by the opaque lines and thus only the opaque lines can be seen by users while the trace conductor lines 330 are invisible to users.

As shown in FIG. 1, the color filter layer 170 is disposed on a surface of the black matrix sensing electrode layer 140 that faces the liquid crystal layer 130.

The thin film transistor layer 180 is disposed on a surface of the lower substrate 120 that faces the display material layer 130. The thin film transistor layer 180 is composed of thin film transistors 182 and transparent electrodes 181.

The overcoat layer 190 is disposed on the surface of the upper substrate 110 that faces the display material layer 130.

The common electrode layer 200 is disposed between the overcoat layer 190 and the display material layer 130.

The upper polarizer layer 210 is disposed on one surface of the upper substrate 110 opposite to the other surface of the upper substrate 110 facing the display material layer 130.

The lower polarizer layer 220 is disposed on one surface of the lower substrate 120 opposite to the surface of the lower substrate 120 facing the display material layer 130.

Figure 7:
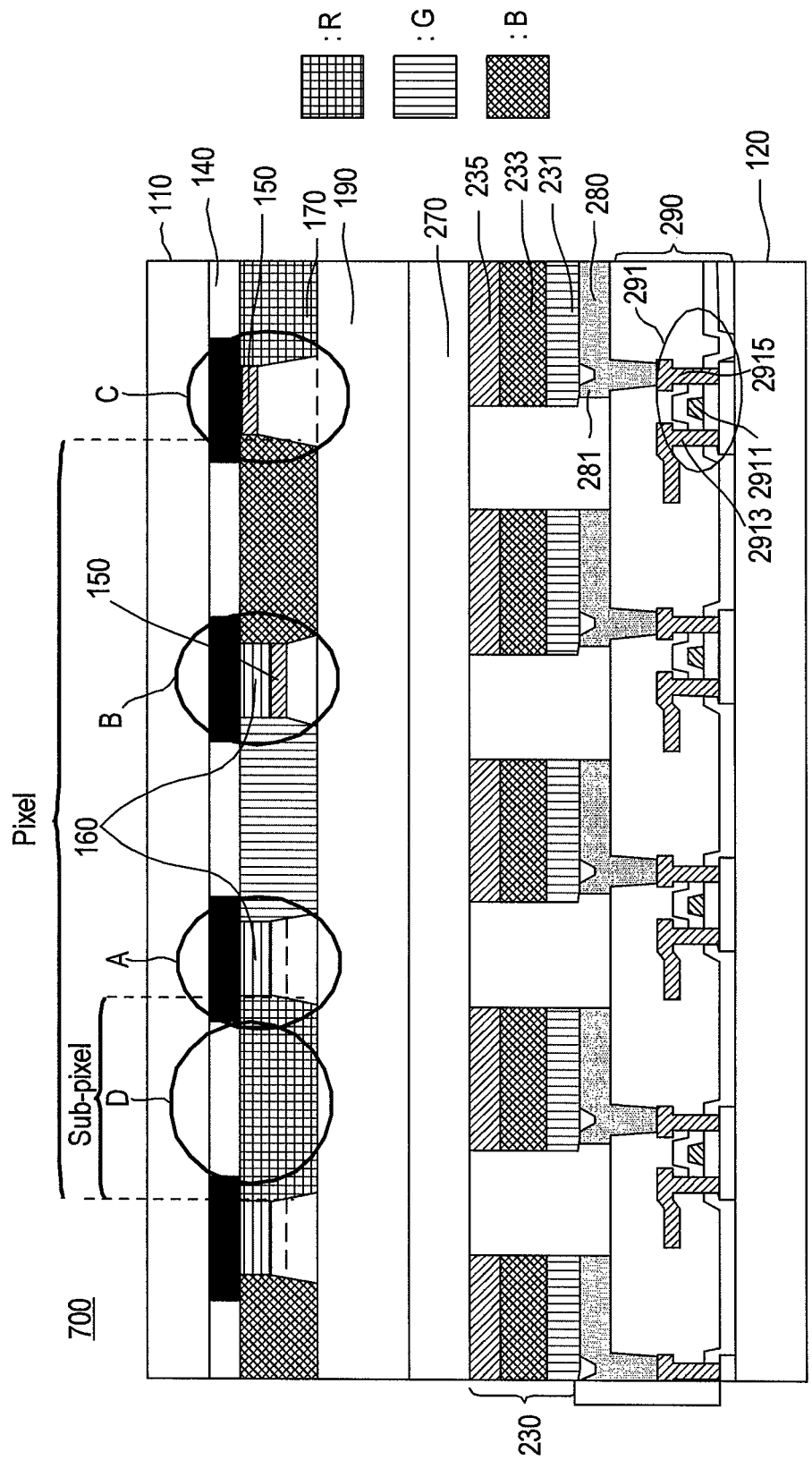
FIG. 7 is another stack-up diagram of the in-cell touch display panel structure using conductive wires to connect with sensing electrodes in accordance with the present invention.

In the embodiment of FIG. 1, the display material layer 130 is a liquid crystal layer. FIG. 7 is a stack-up diagram of another preferred embodiment of the present invention, wherein the display material layer is an OLED layer. As shown in FIG. 7, the in-cell touch display panel structure using conductive wires to connect with sensing electrodes 700 includes an upper substrate 110, a lower substrate 120, a display material layer 230, a black matrix sensing electrode layer 140, a sensing electrode trace layer 150, an insulation layer 160, a color filter layer 170, an overcoat layer 190, a cathode layer 270, an anode layer 280, and a thin film transistor layer 290.

The embodiment of FIG. 7 is similar to that of FIG. 1 except for the display material layer 230, the cathode layer 270, the anode layer 280, and the thin film transistor layer 290.

The thin film transistor layer 290 is disposed at the surface of the lower substrate 120 facing the display material layer 230.

The thin film transistor layer 290 includes K gate lines and L source lines, wherein K and L are positive integers. The gate lines and source lines are well-known to those skilled in the art of display panel, and thus are not shown in the figures. Based on a display pixel signal and a display driving signal, pixel driving transistor and capacitor of a corresponding pixel driving circuit are driven so as to proceed with display operation. The K gate lines and the L source lines are disposed at positions corresponding to the positions of the plurality of opaque conductor lines of the black matrix sensing electrode layer 140.

In addition to the gate lines and source lines, the thin film transistor layer 290 further includes a plurality of pixel driving circuits 291. Based on a display pixel signal and a display driving signal, the thin film transistor layer 290 drives a corresponding pixel driving circuit 291 so as to proceed with display operation.

According to different designs of the pixel driving circuit 291, such as 2T1C being a pixel driving circuit formed with two thin film transistors and a storage capacitor, and 6T2C being a pixel driving circuit formed with six thin film transistors and two storage capacitors. The gate 2911 of at least one thin film transistor in the pixel driving circuit 291 is connected to a gate line (not shown). According to different designs of driving circuit, a source/drain 2913 of at least one thin film transistor in a control circuit is connected to a source line (not shown) and a source/drain 2915 of at least one thin film transistor in pixel driving circuit 291 is connected to a corresponding anode pixel electrode 281 of the anode layer 280.

The cathode layer 270 is disposed at one side of the overcoat layer 190 facing the display material layer 230 and between the upper substrate 110 and the display material layer 230. The cathode layer 270 is formed with metal material, preferably metal material with thickness being less than 50 nm. The metal material is selectively to be aluminum, silver, magnesium, calcium, potassium, lithium, indium, their alloy, or combination of lithium fluoride, magnesium fluoride, lithium oxide. Due to the thickness of the cathode layer 270 being less than 50 nm, the light generated by the display material layer 230 can pass through it, so as to show images on the upper substrate 110. The cathode layer 270 is intact piece electrical connection, so that it can be used as a shielding. Moreover, the cathode layer 270 also receives the current coming from the anode pixel electrode 281.

The anode layer 280 is disposed at one side of the thin film transistor layer 290 facing the display material layer 230. The anode layer 280 includes a plurality of anode pixel electrodes 281. Each of the anode pixel electrodes 281 is corresponding to one pixel driving transistor of the pixel driving circuit 291 of the thin film transistor layer 290. That is, each of the anode pixel electrodes 281 is connected to a source/drain 2915 of the pixel driving transistor of the corresponding pixel driving circuit 291, so as to form a pixel electrode of a specific color, for example a red pixel electrode, a green pixel electrode, a blue pixel electrode, or a white pixel electrode which is adopted in the present invention.

The display material layer 230 includes a hole transporting layer 231, an emitting layer 233, and an electron transporting layer 235. The display material layer 230 preferably emits white light, and uses the color filter layer 170 to filter out and to generate red, blue, green primary colors.

Figure 8:
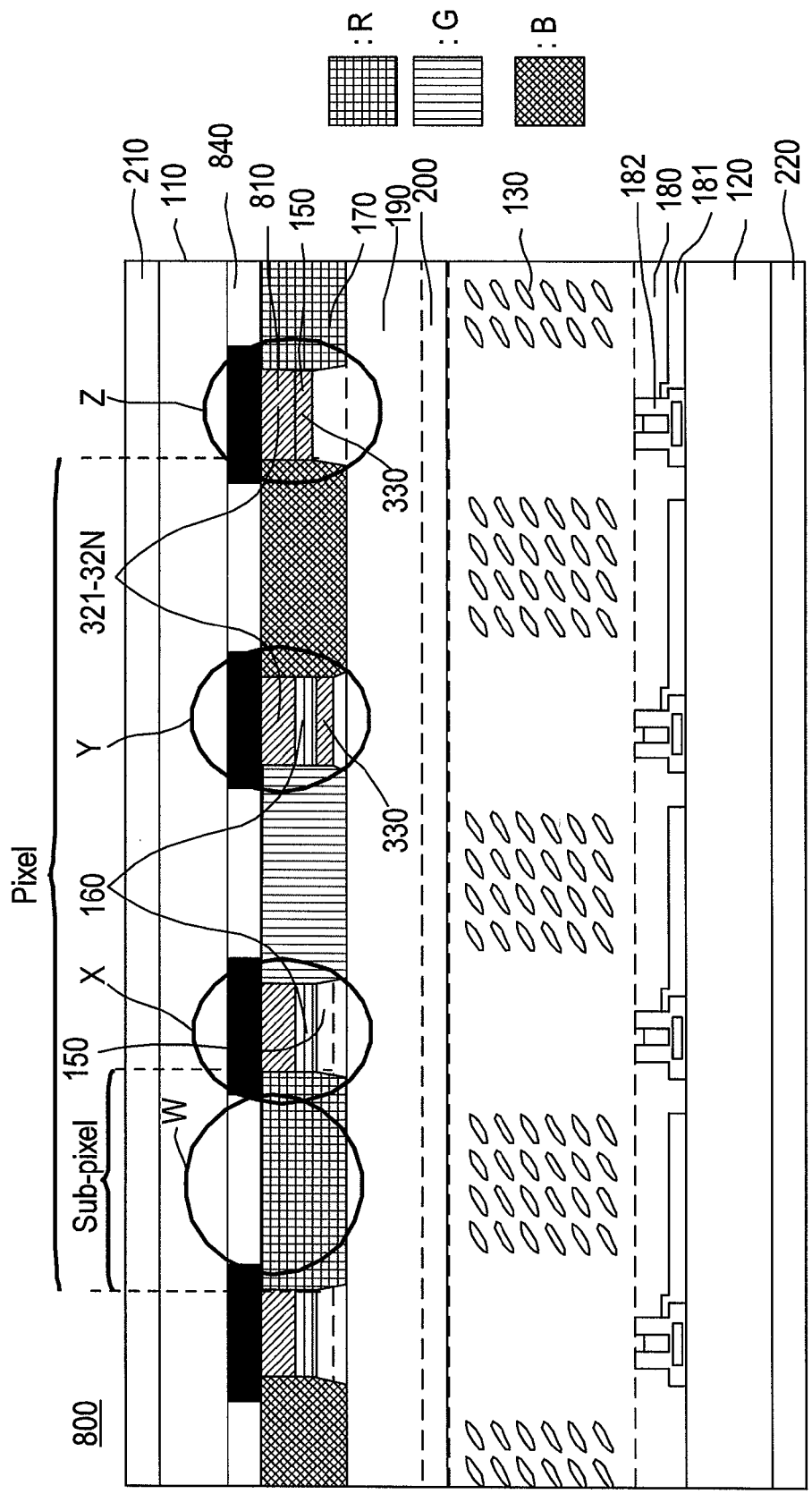
FIG. 8 is still another stack-up diagram of the in-cell touch display panel structure using conductive wires to connect with sensing electrodes in accordance with the present invention.

FIG. 8 is still another stack-up diagram of the in-cell touch display panel structure using conductive wires to connect with sensing electrodes 800 in accordance with the present invention. As shown, the in-cell touch display panel structure using conductive wires to connect with sensing electrodes 800 includes an upper substrate 110, a lower substrate 120, a display material layer 130, a black matrix layer 840, a sensing electrode trace layer 150, an insulation layer 160, a color filter layer 170, a thin film transistor layer 180, an overcoat layer 190, a common voltage layer 200, a upper polarizer layer 210, a lower polarizer layer 220 and a sensing electrode layer 810.

The embodiment of FIG. 8 is similar to that of FIG. 1 except for the black matrix layer 840 and the sensing electrode layer 810. The black matrix layer 840 is the prior black matrix layer 500, as shown in FIG. 2, which is composed of a plurality opaque lines that cannot be used as sensing electrodes. Therefore, the newly added sensing electrode layer 810 is formed on the surface of the black matrix layer 840 that faces the display material layer 130. The sensing electrode layer 810 is composed of a plurality of conductor lines. After patterning the plurality of conductor lines, a plurality of sensing electrodes can be formed. That is, the plurality of sensing electrodes formed by patterning the plurality of opaque conductor lines shown in FIG. 1 are replaced with the plurality of sensing electrodes formed on the sensing electrode layer 810 in this embodiment.

As shown in FIG. 8, the insulation layer 160 is disposed between the sensing electrode trace layer 150 and the sensing electrode layer 810. As shown by the oval "X" in FIG. 8, insulation material is filled in the portion of the insulation layer 160 where there is no trace conductor line 330 corresponding thereto. Further, as shown by the oval "Y" in FIG. 8, insulation material is filled in the portion of the insulation layer 160 where there is trace conductor line 330 corresponding thereto as there is a need to insulate the trace conductor line 330 from the sensing electrodes (320-1 to 320-N). Yet further, as shown by the oval "Z" in FIG. 8, the portion of the insulation layer 160 where there is trace conductor line 330 corresponding thereto is left empty, so as to make an electrical connection of the trace conductor line 330 and the sensing electrodes (320-1 to 320-N). Still further, as shown by the oval "W" in FIG. 8, the portion has to allow light pass through and thus the portion is red color filter 170.

Figure 9:
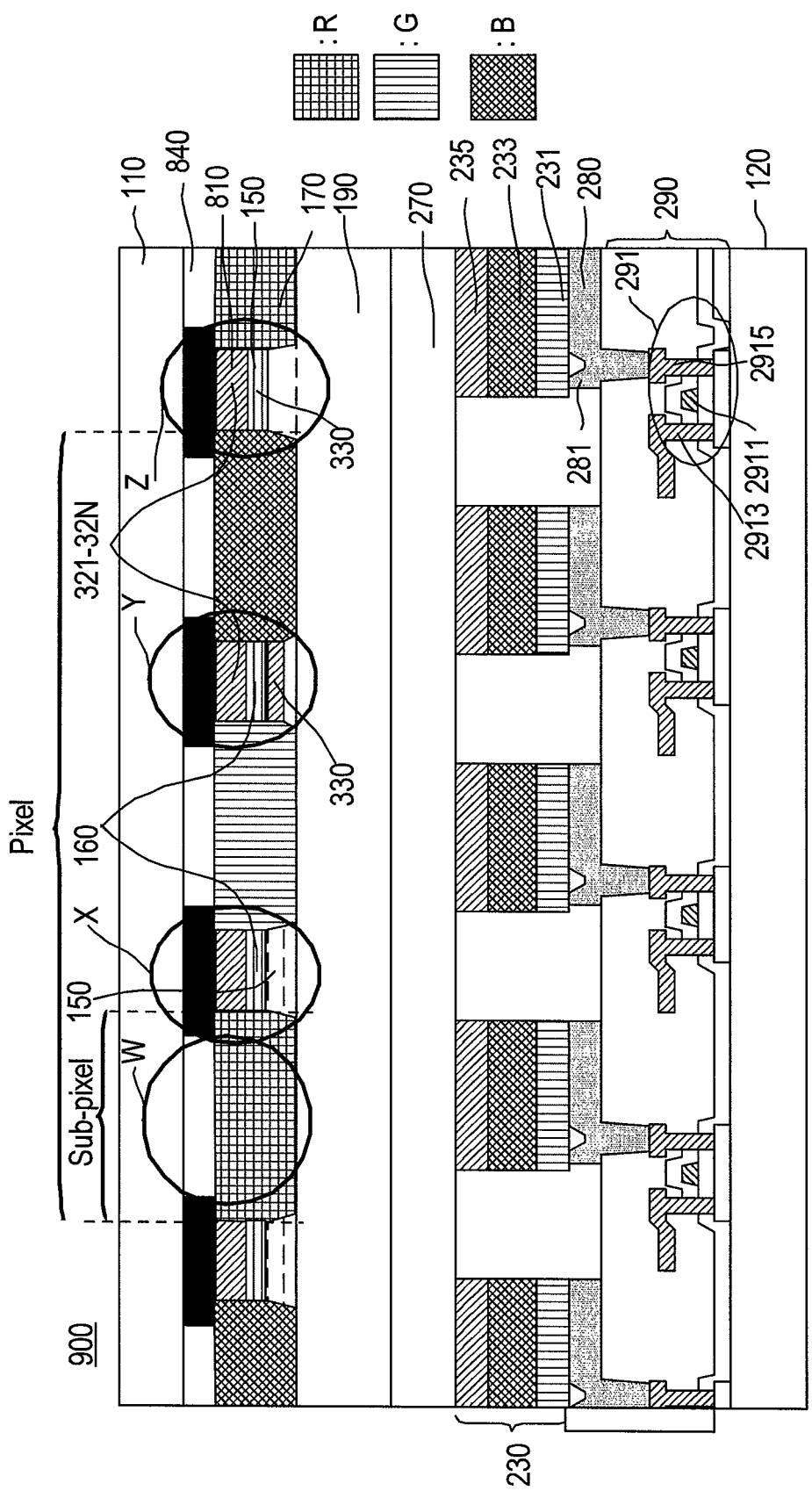
FIG. 9 is yet another stack-up diagram of the in-cell touch display panel structure using conductive wires to connect with sensing electrodes in accordance with the present invention.

FIG. 9 is yet another stack-up diagram of the in-cell touch display panel structure using conductive wires to connect with sensing electrodes in accordance with the present invention, wherein the display material layer is an OLED layer. As shown, the in-cell touch display panel structure using conductive wires to connect with sensing electrodes 900 includes an upper substrate 110, a lower substrate 120, a display material layer 230, a black matrix layer 840, a sensing electrode layer 810, a sensing electrode trace layer 150, an insulation layer 160, a color filter layer 170, an overcoat layer 190, a cathode layer 270, an anode layer 280, and a thin film transistor layer 290. The technical content of this embodiment can be understood by those skilled in the art with reference to those embodiments shown in FIGS. 1, 7 and 8, and thus a detailed description is deemed unnecessary.

In view of the foregoing, it is known that the present invention is capable of forming a single-layered touch pattern on the black matrix electrode layer 140 or the sensing electrode layer 810, which has the advantage of not requiring to arrange an additional transparent sensing electrode layer on the upper glass substrate or lower glass substrate of the display panel, thereby lowering the cost and increasing the accuracy of touch sensing.

Although the present invention has been explained in relation to its preferred embodiment, it is to be understood that many other possible modifications and variations can be made without departing from the spirit and scope of the invention as hereinafter claimed.

What is claimed is:

1. An in-cell touch display panel structure using conductive wires to connect with sensing electrodes, comprising:
   an upper substrate;
   a lower substrate parallel to the first substrate;
   a display material layer configured between the upper substrate and the lower substrate;
   a black matrix sensing electrode layer disposed on one surface of the upper substrate facing the display material layer, the black matrix sensing electrode layer being composed of a plurality of opaque conductor lines arranged as a checkerboard pattern for defining spaces disposed therein color filter so that the black matrix sensing electrode layer also serves as a black matrix layer, wherein a plurality of sensing electrodes are formed by patterning part of the plurality of opaque conductor lines;
   a sensing electrode trace layer disposed on one surface of the black matrix sensing electrode layer facing the display material layer, the sensing electrode trace layer being composed of a plurality of trace conductor lines; and
   an insulation layer disposed between the sensing electrode trace layer and the black matrix sensing electrode layer, and having insulation material for preventing the trace conductor lines from contacting the sensing electrodes,
   wherein each sensing electrode is connected with at least one trace conductor line by electrically connecting said at least one trace conductor line to said each sensing electrode through a via defined in the insulation layer, and the plurality of trace conductor lines are disposed at positions corresponding to those of the plurality of opaque conductor lines of the black matrix sensing electrode layer, thereby neither decreasing transparency nor increasing thickness of the in-cell touch display panel structure,
   wherein the plurality of sensing electrodes are N mesh-type polygonal regions and any two mesh-type polygonal regions are not electrically connected with each other on the black matrix sensing electrode layer, so as to form a single-layered sensing touch pattern on the black matrix sensing electrode layer, where N is an integer greater than one.

2. The in-cell touch display panel structure using conductive wires to connect with sensing electrodes as claimed in claim 1, wherein the trace conductor lines connected with different sensing electrodes are not connected with each other.

3. The in-cell touch display panel structure using conductive wires to connect with sensing electrodes as claimed in claim 2, wherein the plurality of sensing electrodes of the black matrix sensing electrode layer are arranged in a first direction and a second direction, the first direction being substantially vertical to the second direction.

4. The in-cell touch display panel structure using conductive wires to connect with sensing electrodes as claimed in claim 3, wherein the plurality of trace conductor lines of the sensing electrode trace layer are made of conductive metal material or alloy.

5. The in-cell touch display panel structure using conductive wires to connect with sensing electrodes as claimed in claim 4, further comprising:
   a color filter layer disposed on a surface of the black matrix sensing electrode layer facing the display material layer; and
   a thin film transistor layer disposed on one surface of the lower substrate facing the display material layer.

6. The in-cell touch display panel structure using conductive wires to connect with sensing electrodes as claimed in claim 5, wherein the display material layer is a liquid crystal layer.

7. The in-cell touch display panel structure using conductive wires to connect with sensing electrodes as claimed in claim 5, wherein the display material layer is an OLED layer.

8. An in-cell touch display panel structure using conductive wires to connect with sensing electrodes, comprising:
   an upper substrate;
   a lower substrate parallel to the first substrate;
   a display material layer configured between the upper substrate and the lower substrate;
   a black matrix layer disposed on one surface of the upper substrate facing the display material layer, the black matrix layer being composed of a plurality of opaque lines arranged as a checkerboard pattern for defining spaces disposed therein color filter;
   a sensing electrode layer formed on one surface of the black matrix layer facing the display material layer, the sensing electrode layer being composed of a plurality of conductor lines, the plurality of conductor lines being patterned to form a plurality of sensing electrodes;

an insulation layer disposed on one surface of the sensing electrode layer facing the display material layer; and a sensing electrode trace layer disposed on one surface of the insulation layer facing the display material layer, the sensing electrode trace layer being composed of a plurality of trace conductor lines, wherein the insulation layer has insulation material for preventing the trace conductor lines from contacting the sensing electrodes, wherein each sensing electrode is connected with at least one trace conductor line by electrically connecting said at least one trace conductor line to said each sensing electrode through a via defined in the insulation layer, and the plurality of trace conductor lines are disposed at positions corresponding to those of the plurality of opaque lines of the black matrix layer, thereby neither decreasing transparency nor increasing thickness of the in-cell touch display panel structure, wherein the plurality of sensing electrodes are N mesh-type polygonal regions and any two mesh-type polygonal regions are not electrically connected with each other on the sensing electrode layer, so as to form a single-layered sensing touch pattern on the sensing electrode layer, where N is an integer greater than one.

9. The in-cell touch display panel structure using conductive wires to connect with sensing electrodes as claimed in claim 8, wherein the trace conductor lines connected with different sensing electrodes are not connected with each other.

10. The in-cell touch display panel structure using conductive wires to connect with sensing electrodes as claimed in claim 9, wherein the plurality of sensing electrodes of the sensing electrode layer are arranged in a first direction and a second direction, the first direction being substantially vertical to the second direction.

11. The in-cell touch display panel structure using conductive wires to connect with sensing electrodes as claimed in claim 10, wherein the plurality of trace conductor lines of the sensing electrode trace layer are made of conductive metal material or alloy.

12. The in-cell touch display panel structure using conductive wires to connect with sensing electrodes as claimed in claim 11, further comprising:

a color filter layer disposed on a surface of the black matrix layer facing the display material layer; and a thin film transistor layer disposed on one surface of the lower substrate facing the display material layer.

13. The in-cell touch display panel structure using conductive wires to connect with sensing electrodes as claimed in claim 12, wherein the display material layer is a liquid crystal layer.

14. The in-cell touch display panel structure using conductive wires to connect with sensing electrodes as claimed in claim 12, wherein the display material layer is an OLED layer.

* * * * *